E. F. BEEBE.
WASHING MACHINE.
APPLICATION FILED DEC. 26, 1908.
935,953.
Patented Oct. 5, 1909.
5 SHEETS—SHEET 2.
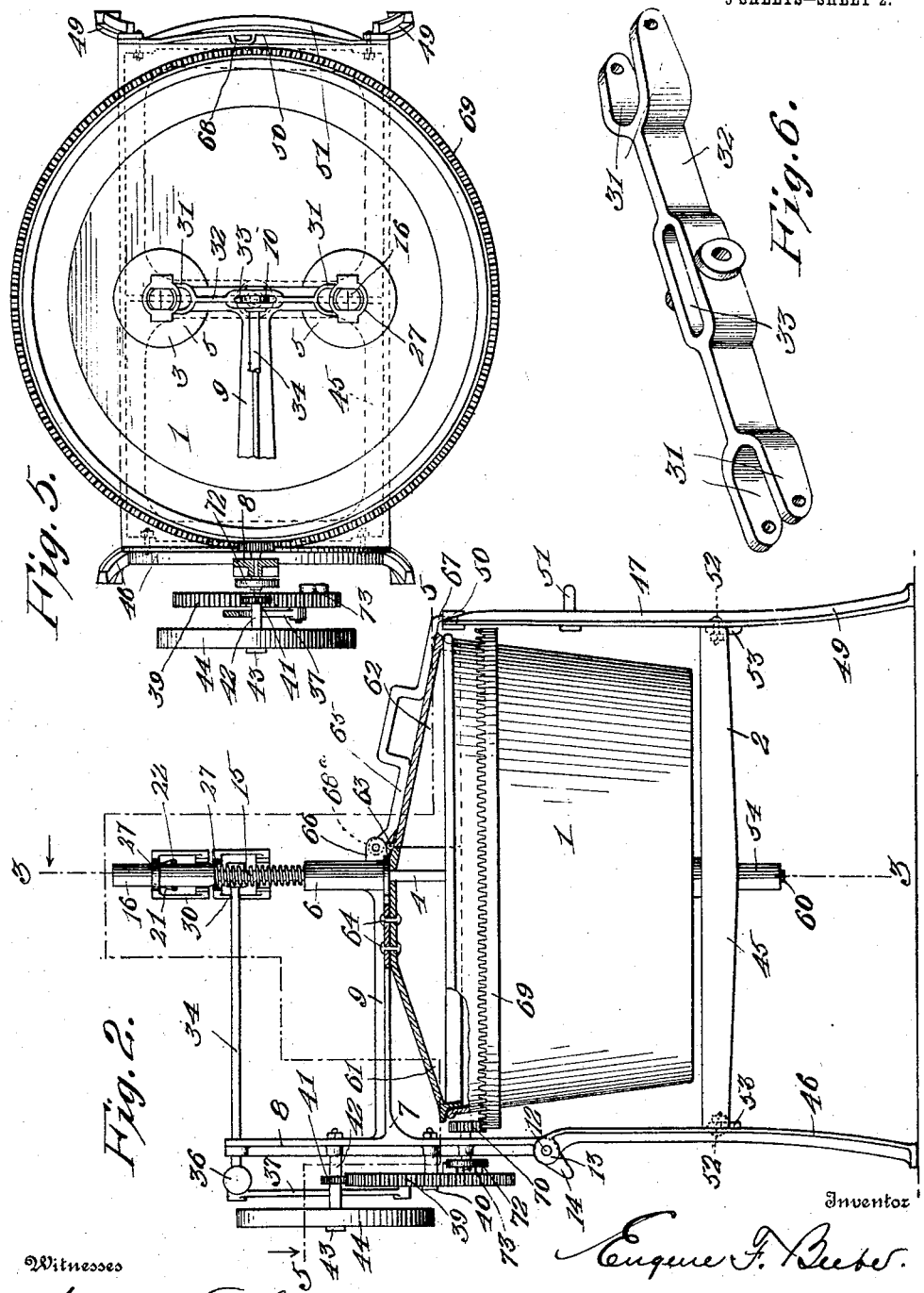

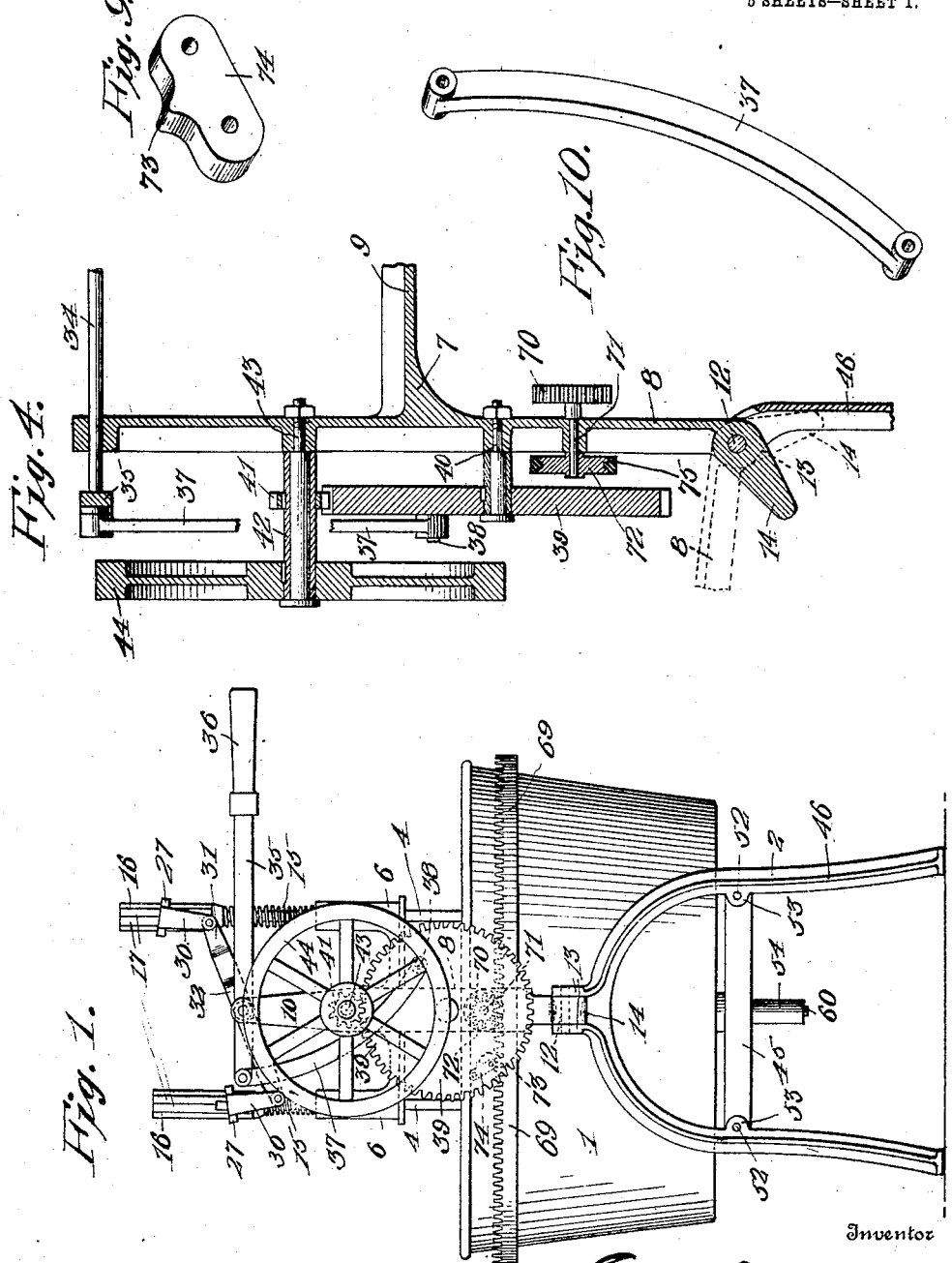

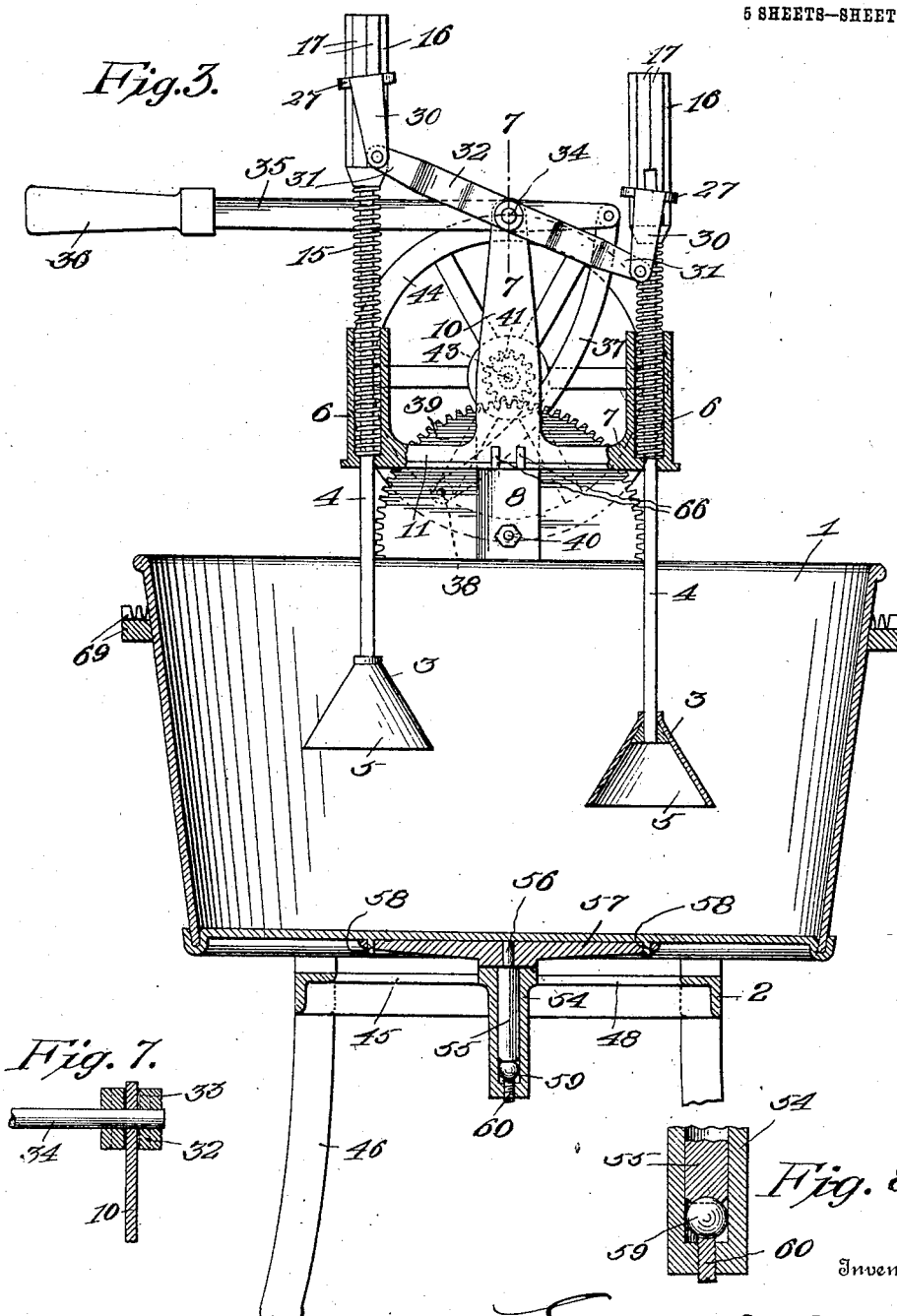

E. F. BEEBE.
WASHING MACHINE.
APPLICATION FILED DEC. 26, 1908.
935,953.
Patented Oct. 5, 1909.
5 SHEETS—SHEET 4.
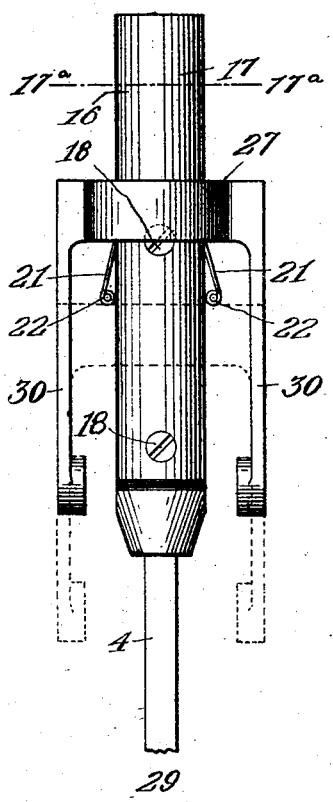
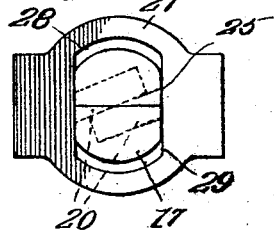
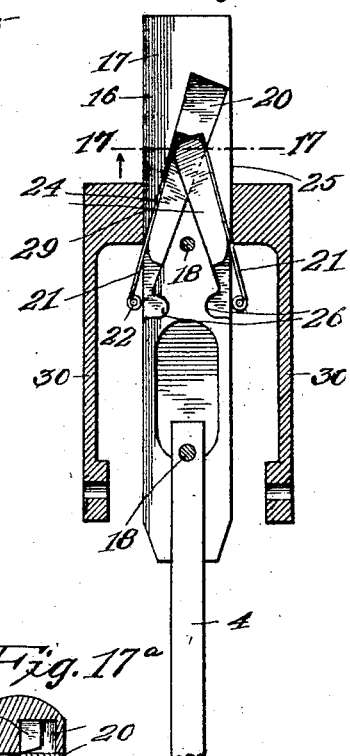
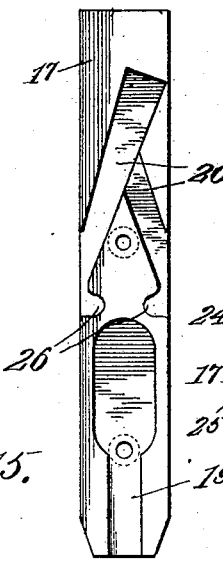
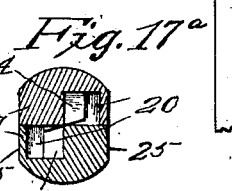
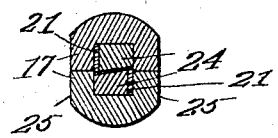
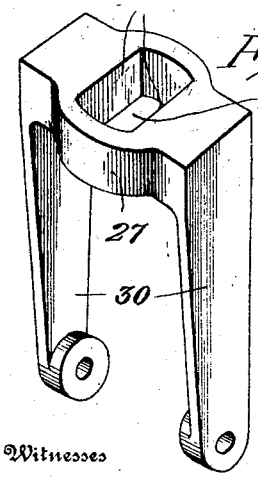
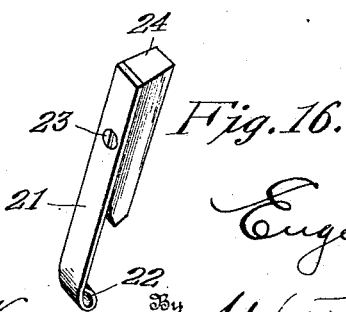
Witnesses
James F. Crown
Madelon E. Burns
Inventor
Eugene F. Beebe
By Watson E. Coleman
Attorney E. F. BEEBE.
WASHING MACHINE.
APPLICATION FILED DEC. 26, 1908.
935,953.
Patented Oct. 5, 1909.
5 SHEETS—SHEET 5.
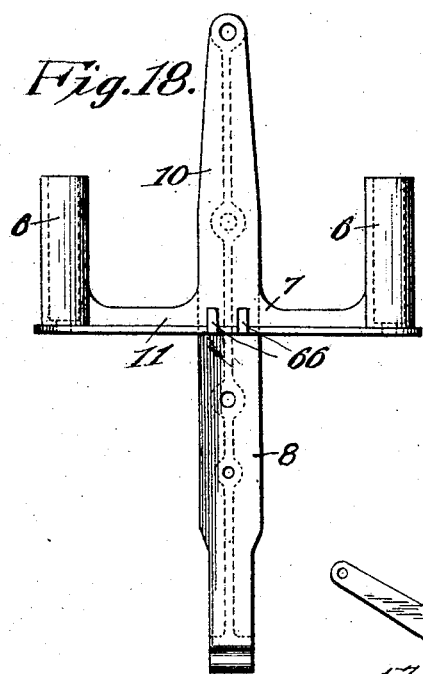
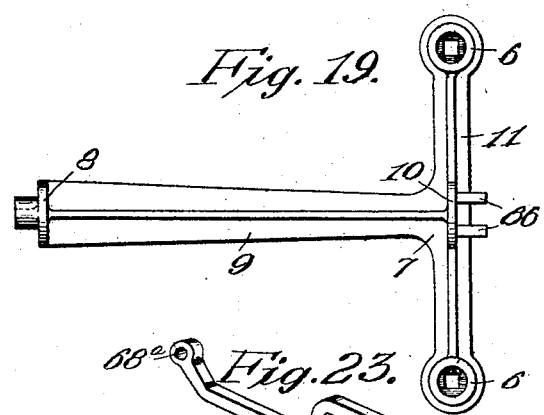
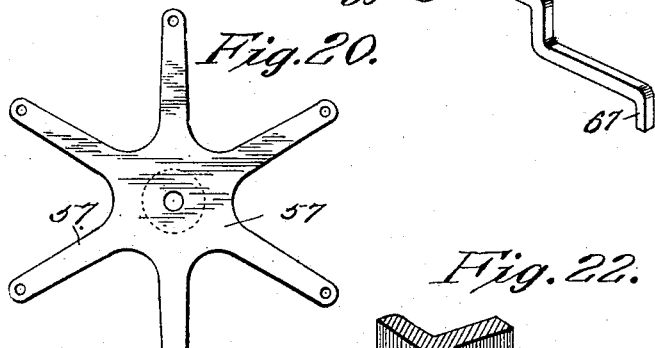
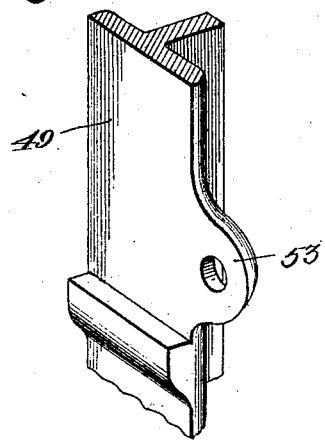
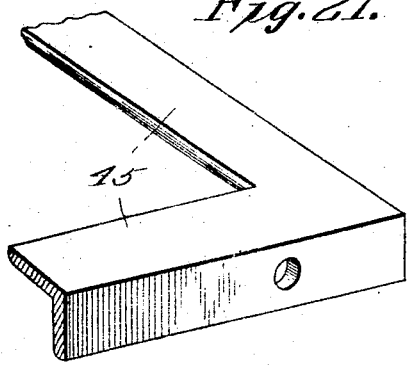
Witnesses
James F. Crown
Madelon E. Burns
Inventor
Eugene F. Beebe
By Watson E. Coleman
Attorney

UNITED STATES PATENT OFFICE.

EUGENE F. BEEBE, OF MINNEAPOLIS, MINNESOTA.

WASHING-MACHINE.

935,953.  Specification of Letters Patent.  Patented Oct. 5, 1909.

Application filed December 26, 1908. Serial No. 469,362.

*To all whom it may concern:*

Be it known that I, EUGENE F. BEEBE, a citizen of the United States, residing at Minneapolis, in the county of Hennepin and State of Minnesota, have invented certain new and useful Improvements in Washing-Machines; of which the following is a specification, reference being had to the accompanying drawings.

This invention relates to improvements in washing machines, and more particularly the one set forth in my co-pending application filed June 12, 1908 and bearing Serial Number 438,181.

The objects of the present invention are, first, to provide an improved lock head or locking catch for releasably connecting the staff of the pounder to its depressing collar or element; second, to provide improved means for mounting and operating the pounders; third, improved means for intermittently rotating the tub; and fourth, to generally improve and simplify the construction and operation of the various parts of the machine and thereby render the latter stronger, more durable and efficient and at the same time less expensive.

With the above and other objects in view, the invention consists of the novel features of construction and the combination and arrangement of parts hereinafter fully described and claimed, and illustrated in the accompanying drawings, in which—

Figure 1 is a front elevation of the improved washing machine; Fig. 2 is a side elevation; Fig. 3 is a vertical section taken on the plane indicated by the line 3—3 in Fig. 2; Fig. 4 is an enlarged detail vertical section through the pounder supporting and carrying frame and the gearing thereon; Fig. 5 is a view partly in top plan and partly in section, the plane of the parts in section being indicated by the irregular line 5—5 in Fig. 2; Fig. 6 is a detail perspective of the oscillatory lever for actuating the pounder depressing collars or elements; Fig. 7 is a detail section taken on the plane indicated by the line 7—7 in Fig. 3; Fig. 8 is an enlarged detail section showing the ball bearing for the pivot of the tub; Fig. 9 is a detail perspective of the cam block for intermittently rotating the friction wheel which causes the rotary movement of the tub; Fig. 10 is a detail perspective of the curved link which is connected to the hand lever; Fig. 11 is a side elevation of a portion of one of the pounder staffs, its lock head and actuating collar; Fig. 12 is a top plan view of the same; Fig. 13 is a vertical sectional view through the same; Fig. 14 is a view of the inner face of one of the half-sections of the lock head; Fig. 15 is a detail perspective of one of the depressing collars or elements; Fig. 16 is a detail perspective of the spring catch; Fig. 17 is a detail section taken on the plane indicated by the line 17—17 in Fig. 13; Fig. 17ᵃ is a detail section taken on the plane indicated by the line 17ᵃ—17ᵃ in Fig. 11; Fig. 18 is a front elevation of the frame or casting for supporting the pounders; Fig. 19 is a top plan view of the same; Fig. 20 is a detail view of the tub supporting member or spider; Figs. 21 and 22 are detail perspective views showing parts of the frame or stand; and Fig. 23 is a detail perspective of the brace for the pounder supporting frame or casting.

In the drawings 1 denotes a tub mounted, preferably for rotation, upon a stand or supporting frame 2, and 3 denotes a pair of reciprocating pounders each of which consists of a staff 4 having suitably fixed to its lower end a head or cup 5 here shown in the form of a cone provided with an open bottom. The staffs 4 are preferably in the form of straight flat faced metal rods of square or other cross sectional shape and are arranged for sliding movement in similar-shaped openings formed in the bottoms of guide tubes or sleeves 6.

The guides 6 are carried by a supporting member or frame 7 preferably in the form of a casting consisting of an upright portion or standard 8 from the central part of which projects a horizontal arm 9 provided at its end with an upright 10 and a cross bar 11, at the ends of which latter are formed the tubular guides 6. The member or casting 7 carries the pounders, their operating mechanism, a cover for the tub and also means for rotating the tub, and in order to permit all of these parts to be swung out of the way to permit of ready access to the interior of the tub, the lower end of the standard 8 is preferably pivoted at 12 between spaced ears 13 formed upon the front member of the stand 2. In order to support these parts when tilted forwardly away from the tub, said lower end of the standard 8 is formed with a stop projection 14 which is adapted to engage the upright portion of the front member of the stand 2, as indicated in dotted lines in Fig. 4 of the drawings.

The pounders 3 are actuated upwardly by coil springs 15 which surround their staffs and have their lower ends arranged and seated in the tubular guides 6 and their upper ends engaged with lock heads 16 arranged upon the upper ends of the pounder staffs. Each of the lock heads 16, as clearly shown in Figs. 11 to 14 inclusive of the drawings, preferably consists of two similar substantially semi-cylindrical half-sections 17 having their opposing inner flat faces held in contact by transverse screws or similar fastenings 18, the lower one of which also passes through the upper end of the plunger staff 4 to unite the lock head to said staff, as seen in Fig. 13. In the lower ends of the half-sections 17 of the lock head are formed opposing channels or recesses 19 shaped to receive the upper end of the pounder staff 4, as seen in Fig. 14.

Formed in the upper portions of the flat opposing inner faces of the two half-sections 17 of the lock head are angularly arranged and intersecting recesses 20 in which are slidably arranged spring locking catches or dogs 21. Each of these retractable catches or dogs consists of a leaf spring having its lower end bent or coiled inwardly upon itself to provide a rounded head 22 and its upper end secured by a screw or similar fastening 23 to a block 24 which serves as a weight to actuate the spring catch or dog 21 downwardly in its recess or seat 20. Said block or weight 24 is preferably wedge-shaped so that it tapers from its upper to its lower end, and the recess or seat 20 which receives it, is similar in shape so that the downward movement of the catch or dog will be limited. The recesses or seats 20, portions of which are formed in each of the half-sections 17 of the lock head, are inclined downwardly and outwardly, as seen in Fig. 14, their large ends being at the top and their small ends opening at the opposite sides of the lock head to permit the heads 22 and adjacent portions of the spring catches to project beyond the opposite faces of the half-sections 17, which latter have flattened portions 25, as shown in Fig. 12, for a purpose presently explained. The recesses or seats 20 are of such length that the spring catches 21, with their weight blocks 24, may be moved upwardly into them so that the heads 22 of the catches will not project beyond the flat faces 25 of the half-sections 17, and the lower ends of said recesses or seats 20 have enlarged portions 26 into which the heads 22 of the spring catches may be sprung while the catches or dogs remain in their lowered position shown in Fig. 13.

The pounders are depressed or actuated downwardly by means of reciprocating elements or members 27, preferably in the form of collars, which surround the lock head 16 and which have a free longitudinal sliding movement and a limited lateral swinging movement, but are prevented from rotating axially. This mounting of the actuating members or collars 27 is effected by forming them with central openings 28 of greater diameter than the lock heads and providing said openings 28, at opposite points, with flat faced walls 29 to engage and slide upon the flat faces 25 of said lock heads. The flat faces 25, 29 of these two parts prevent axial rotary motion of one with respect to the other and the greater diameter of the opening 28 permits the collars to have a limited lateral or transverse swinging movement. Formed integral with and depending from the opposite sides of the collars 27 are arms 30 which receive between them and are pivoted to the forked ends 31 of a rocking lever 32. The latter has at its center a longitudinally arranged slot or loop-shaped portion 33 to receive the upper extremity of the upright 10 on the pounder supporting member or casting 7, which upright 10 serves as one of the bearings for a horizontal rock shaft 34. The latter extends through the loop-shaped central portion 33 of the rocking lever which is suitably fixed thereto, so that when the shaft is rocked the lever or cross head 32 will be oscillated to impart reciprocatory movement to the collars or members 27.

While any suitable means may be provided for operating the shaft 34 either manually or by a power device, a hand lever 35 is here shown as fixed to its outer end, which end has a bearing in the upper extremity of the standard 8. Said lever 35 is fixed intermediate its ends to the shaft and upon its long end is a suitable handle 36, while its short end is pivoted to a longitudinally curved link 37. The other end of this link is connected to a crank pin 38 on a rotary element 39 here shown in the form of a cog wheel or gear rotatably mounted on a stub shaft 40 in the form of a bolt arranged in the intermediate portion of the standard 8. Said gear 39 meshes with a pinion 41 fixed to one end of a sleeve 42 which is rotatable on a similar stub shaft 43 carried by the upper portion of the standard 8. Fixed to the other end of the sleeve 42 is a fly wheel 44, the momentum of which facilitates the operation of the machine, as will be readily understood.

The stand or supporting frame 2 on which the tub is mounted is preferably constructed of metal and consists of three members or sections, namely, a bottom section 45, a front section 46 and a rear section 47. The bottom section 45 is of open rectangular form preferably composed of a single casting and having right angular side and end bars and a central cross bar 48 which unites its two side bars. The front section 46 of the stand is also in the form of a casting and is of inverted U-shape, the depending arms of which form supporting legs and the closed central upper portion of which is formed with the ears or lugs 13. The rear section 47 is of substantially rectangular form, consisting of two upright bars or legs 49 united by upper and lower curved cross bars 50, 51 to which may be fastened a clothes wringer. Bolts 52 are provided for fastening the front and rear sections 46, 47 of the stand to the ends of the bottom section 45 and, in order to render this connection more effective, integral supporting lugs or shoulders 53 are formed upon the legs of the sections 46, 47 on which the bottom section 45 rests, as will be readily understood upon reference to Figs. 2, 21 and 22 of the drawings.

The cross bar 48 in the center of the bottom section 45 of the stand is formed with an integral tubular upright bearing 54 to receive a rotary pivot pin 55 which carries the tub. Said pivot pin has a reduced upper end 56 to fit in a central opening in a tub supporting casting 57 which is in the form of a spider having its radiating arms apertured to receive studs 58 secured to and projecting from the under face of the bottom of the tub, as seen in Fig. 3. The lower end of the pivot pin 55 has a concaved cavity or seat to receive a single bearing ball 59 which is arranged in the bottom of the tubular bearing 54 and is adjustably supported on a concaved seat in the upper end of a screw 60, which latter is located in a threaded opening in the bottom of the bearing 54, as shown more clearly in Fig. 8 of the drawings. This anti-friction bearing for the tub renders its rotation easy and at the same time provides a strong and effective mounting which will permit the tub to be readily removed from the stand.

The cover for the tub is preferably composed of two sections 61, 62 which are hingedly connected, as shown at 63. The section 61 is secured by rivets or similar fastenings 64 to the arm 9 of the member or casting 7, as shown in Fig. 2, so that when said member or casting is swung away from the tub the cover will be carried with it. The surrounding rim on the cover is adapted to engage the upper edge or rim of the tub and thereby support the member or casting 7 when in its normal operative position, and in order to relieve these parts of strain and to more effectively support and brace the casting 7, a pivoted brace 65 is provided. The latter has one of its ends pivoted between spaced ears or lugs 66 upon the outer end of the arm 9 and its free or bent end 67 is adapted to engage a seat 68 provided upon the bar 50, as seen in Fig. 5 of the drawings. This brace is hinged at 68ª so that it may be swung upwardly out of the way when it is desired to lift the swinging section 62 of the cover to gain access to the interior of the tub, without swinging the member or casting 7 to an inoperative position.

For the purpose of intermittently rotating the tub and thereby cause the cups or heads 5 of the pounders to operate over different portions of the bottom of the tub, a gear ring 69 is suitably fixed to the upper portion of the exterior of the tub and adapted to mesh with said gear ring is a pinion 70 fixed upon one end of a shaft 71 extending through and rotatable in a bearing in the lower portion of the standard 8, as seen in Fig. 4. Fixed to the other end of the shaft 71 is a friction wheel 72 arranged in the path of a cam lug 73 on a block or plate 74 which is secured to the inner face of the rotary element or gear 39. The periphery of the friction wheel 72 is preferably provided with a rim 75 of rubber or similar material which, when struck by the cam lug 73, will prevent noise and slipping of said lug and thereby cause the lug to give the wheel a partial rotation.

The operation of the invention is as follows: As the hand lever is oscillated the rock shaft will oscillate the rocking lever 32 and the latter will reciprocate the pounder actuating members or collars 27, one of said collars being moved downwardly while the other is being elevated. As the collars move downwardly the flat faces 29 of their central openings will engage the projecting portions of the spring locking catches or dogs 21, which latter will thereby lock the pounder staffs to the collars for downward movement therewith. The pounders will be forced downwardly or depressed until the resistance offered by water and clothes in the tub overcomes the tension of the spring catches 21, which latter then spring inwardly into the lower portions of the seats 20 and the recesses 26 and permit the collars 27 to pass beneath them, as indicated in dotted lines in Fig. 11. The instant the pounder staffs are thus unlocked or released from their actuating collars or elements 27, the coil springs surrounding the pounder staffs will actuate the latter upwardly and thereby quickly elevate or retract the pounders. It will be seen, therefore, that this releasable locking connection is entirely automatic. As the collars 27 move upwardly their flat upper faces will engage the projecting heads 22 of the spring catches 21 and will force said catches upwardly into their seats or recesses 20 in the lock head until said heads 22 lie entirely beneath the planes of the flat faces 25 of the lock head, whereupon, the collars pass the spring catches. As the cups or heads on the lower ends of the pounders move downwardly the air within them is compressed and they force the water downwardly through the clothes; and as the pounders are quickly elevated by their retracting springs a partial vacuum or suction is created beneath the cups and the water is sucked or drawn upwardly through the clothes. The repeated action of the pounders in forcing water and air through the clothes causes the latter to be quickly and effectively cleaned. The oscillation of the hand or operating lever also causes the rotation of the gear 39, which latter imparts movement to the fly wheel to facilitate the operation of the machine and which also carries the cam projection or lug 73 for striking the friction wheel 72 and intermittently rotating it. The intermittent rotation of the friction wheel 72 causes the pinion 70 which is fixed to its shaft to intermittently rotate the gear ring 69 and hence the tub.

While the preferred embodiment of the invention has been shown and described in detail, it will be understood that I do not limit myself to the precise construction and arrangement of parts set forth, since various changes in the form, proportion, and minor details may be resorted to without departing from the principle and scope of the invention.

Having thus described the invention what is claimed is:

1. In a washing machine, a pounder, means for operating the same, and a slidably mounted resilient locking catch or dog for operatively connecting the pounder to said operating means, said catch or dog being adapted to automatically release the pounder from the operating means.

2. In a washing machine, a pounder having a staff, an actuating member for depressing the staff, a slidably mounted resilient catch or dog carried by the staff and adapted to co-act with said actuating member, and means for elevating the pounder staff when it is automatically released from said actuating member.

3. In a washing machine, a pounder having a staff provided with a recessed portion, a retractable locking catch or dog slidably arranged in the recess in the staff and having a resilient portion to project outside of the staff, a slidable actuating member or collar upon the staff to co-act with said catch or dog and means for operating said member or collar.

4. In a washing machine, a pounder having a staff provided with a recessed portion, a retractable locking catch or dog slidably arranged in the recess in the staff and having a resilient portion to project outside of the staff a pounder depressing collar slidable upon the staff and adapted to co-act with said catch or dog, means for operating said collar, and means for elevating or retracting the pounder.

5. In a washing machine, a pounder having a staff provided with a recessed portion, a retractable locking catch or dog slidably arranged in the recess in the staff and having a resilient portion to project outside of the staff, a pounder depressing or actuating member slidable upon the staff and adapted to co-act with said catch or dog, means for operating said member, a spring for elevating the pounder, and a support for said spring.

6. In a washing machine, a pounder having a staff, a sectional lock head secured to the staff and recessed, a retractable catch or dog slidably arranged in the recessed portion of the lock head and having a resilient part to project outside of the lock head, a slidable actuating member upon the lock head to co-act with said catch or dog and means for operating said member.

7. In a washing machine, a pounder having a staff provided with a flat faced lock head, a depressing or actuating collar having an opening of greater diameter than the lock head whereby the collar is permitted to have a slight swinging movement, the opening in said collar having flat faces to engage the flat faced portion of the lock head, whereby the collar is permitted to slide freely upon the lock head but is prevented from rotating axially thereon, means for reciprocating said collar and a spring catch or dog carried by the lock head and adapted to co-act with the collar.

8. In a washing machine, a pounder having a staff provided with a lock head, the latter being formed with a downwardly and outwardly inclined recess of greater size at its top than at its bottom, the bottom of said recess opening upon the side of the lock head, a retractable dog or catch slidable in the recess of the lock head and consisting of an attached spring and weight block, the latter being shaped to correspond with the recess and the extremity of the spring being formed with a head and adapted to project outside of the recess when the catch or dog is in its lowered position, a slidable actuating member upon the lock head to co-act with said catch or dog and means for operating said member.

9. In a washing machine, a pounder having a staff, a lock head secured to the staff and consisting of half-sections having their opposing flat faces formed with recesses inclined downwardly and outwardly in opposite directions, a pair of retractable catches or dogs slidably arranged in the recesses and each consisting of a spring and a weight block, the lower ends of the springs having heads and the weight blocks being adapted to project the heads of the springs out of the recesses and beyond the outer faces of the lock head and a slidable actuating member or collar arranged upon the lock head and adapted to co-act with said catches or dogs.

10. In a washing machine, a support, guides, pounders having staffs slidable in said guides, bearings, a rock shaft in said bearings, a rocking lever fixed at its center to said shaft, means for oscillating said shaft, lock heads upon the staffs and provided with flat faced portions and with spring catches, depressing collars having openings of greater diameter than the lock heads and provided with flat faces to engage the flat faces of the lock head, said collars being adapted to co-act with said spring catches and being formed with integral arms pivoted to the ends of the rocking lever, and springs for elevating the pounders.

11. In a washing machine, a tub supporting stand, a casting pivoted to said stand for vertical swinging movement and consisting of a standard, an arm projecting from the intermediate portion of the standard, an upright at the upper end of the arm, and a cross head at the outer end of the arm and provided with guides, pounders having staffs slidable in said guides, a shaft journaled in the upper ends of the standard and upright, means for operating said shaft, and pounder operating means connected to said shaft.

12. In a washing machine, a tub supporting stand, a pounder carrying frame pivoted to one side of the stand for vertical swinging movement, and a foldable brace between the frame and the other side of the stand.

13. In a washing machine, a tub supporting stand, a pounder supporting casting consisting of a standard, an arm projecting from the standard intermediate its ends, an upright projecting from the outer end of the arm, a cross head at the outer end of the arm formed with guides and a stop lug projecting from the lower end of the standard, a horizontal pivot uniting the lower end of the standard to said stand whereby the casting may be swung vertically away from the standard and will be supported by the engagement of said lug with the stand, a foldable brace between the stand and the casting, pounders having staffs slidable in said guides, a pounder operating mechanism actuated by said shaft and means for operating said shaft.

14. In a washing machine, a tub supporting stand having a bearing, a pounder supporting standard hinged to one side of the stand, a tub having a centrally arranged pivot rotatable in said bearing, a gear ring fixed to the exterior of said tub and having its teeth projecting upwardly, a horizontal shaft journaled in said standard, a pinion upon the inner end of said shaft to mesh with the teeth of said gear ring, a friction wheel upon the other end of said shaft, pounders and pounder operating means carried by said standard, said pounder operating means including a rock shaft, a hand lever fixed intermediate its ends on said rock shaft, stub shafts upon said standard, a gear journaled upon one of said stub shafts, a cam lug arranged upon one side face of said gear and adapted to co-act with said friction wheel, a crank pin upon the other side face of said gear, a link connecting said crank pin to one end of said hand lever, a fly wheel upon the other of said stub shafts and a pinion fixedly connected to said fly wheel and in mesh with said gear.

In testimony whereof I hereunto affix my signature in the presence of two witnesses.

EUGENE F. BEEBE.

Witnesses:
W. C. HALL,
L. S. THOMPSON.